(12) United States Patent
Carter et al.

(10) Patent No.: US 10,665,041 B1
(45) Date of Patent: May 26, 2020

(54) SYSTEM AND METHOD OF ACCESS CONTROL FOR SPACES AND SERVICES

(71) Applicant: FUJI XEROX CO., LTD., Tokyo (JP)

(72) Inventors: Scott Carter, Menlo Park, CA (US); Daniel Avrahami, Mountain View, CA (US); Nami Tokunaga, Cupertino, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/178,278

(22) Filed: Nov. 1, 2018

(51) Int. Cl.
*G07C 9/00* (2020.01)
*H04R 29/00* (2006.01)
*H04W 4/80* (2018.01)

(52) U.S. Cl.
CPC ..... *G07C 9/00174* (2013.01); *G07C 9/00126* (2013.01); *H04R 29/004* (2013.01); *H04W 4/80* (2018.02); *G07C 2009/00801* (2013.01)

(58) Field of Classification Search
CPC .................................... G06K 1/00; G06F 1/00
See application file for complete search history.

(56) References Cited

U.S. PATENT DOCUMENTS

| | | | | |
|---|---|---|---|---|
| 9,730,255 | B1 * | 8/2017 | Chu | H04L 65/403 |
| 9,932,013 | B2 | 4/2018 | Hall | |
| 2002/0161501 | A1 * | 10/2002 | Dulin | B06B 1/0215 |
| | | | | 701/45 |

| | | | |
|---|---|---|---|
| 2006/0106646 | A1 | 5/2006 | Squilla et al. |
| 2015/0195649 | A1 | 7/2015 | Vogt |
| 2018/0046864 | A1 | 2/2018 | Flint et al. |

OTHER PUBLICATIONS

Qiu, C., et al., Silent Whistle: Effective Indoor Positioning With Assistance from Acoustic Sensing on Smartphones, 2017 IEEE 18th International Symposium on a World of Wireless, Mobile and Multimedia Networks (WoWMoM), Macau,China, Jun. 12-15, 2017, 7 pgs.
Schweinzer, H., et al., Ultrasonic Device Localization and its Potential for Wireless Sensor Network Security, Control Engineering Practive 10, 2010, p. 852-862.
Language Support, LanBridge, [online] 4 pgs, URL: http://chi2017.acm.org/language-support.html.
Arp, D., et al., Privacy Threats Through Ultrasonic Side Channels on Mobile Devices, 2017 IEEE European Symposium on Security and Privacy (EuroS&P), Paris, France, Apr. 26-28, 2017, 13 pgs.

* cited by examiner

*Primary Examiner* — Shirley Lu
(74) *Attorney, Agent, or Firm* — Procopio, Cory, Hargreaves & Savitch LLP

(57) ABSTRACT

A method of controlling access to an enclosed area having a boundary includes generating a first inaudible audio signal inside the enclosed area, and generating a second signal, each configured to be sensed by a sensing device, wherein the first inaudible audio signal is not capable of penetrating the boundary; determining a state of the enclosed area, based on either the first inaudible audio signal, or the first inaudible audio signal and the second signal, being sensed by the sensing device; and based on the state, generating an instruction to perform access control for the enclosed area.

19 Claims, 16 Drawing Sheets
(10 of 16 Drawing Sheet(s) Filed in Color)

100

_300_

600 FIG. 6(a)　　　FIG. 6(b)　　　FIG. 6(c)
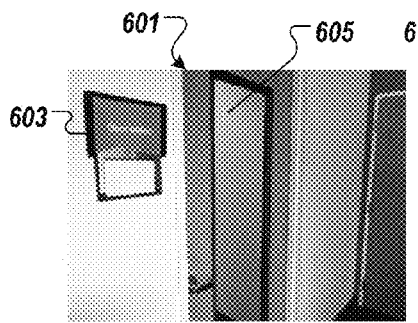 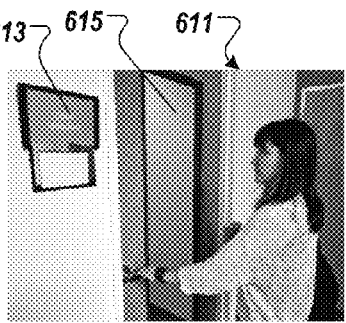 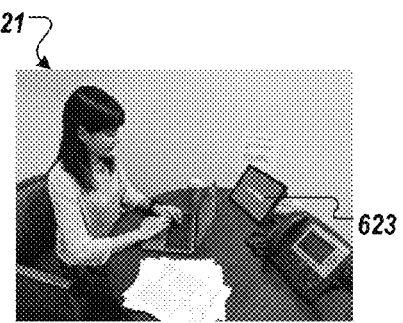
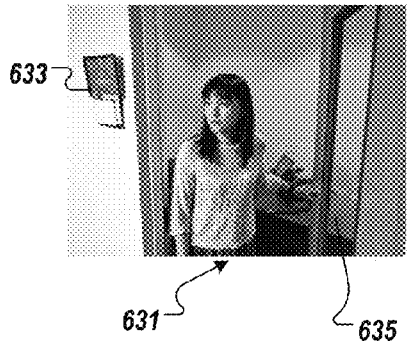 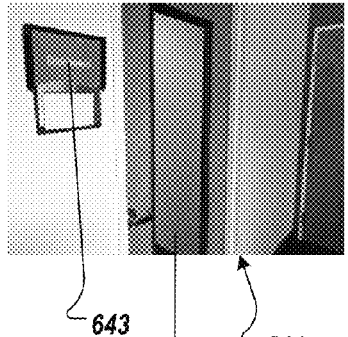 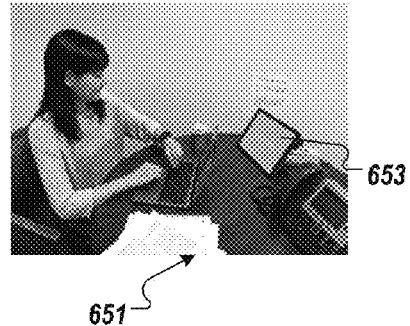
FIG. 6(d)　　　FIG. 6(e)　　　FIG. 6(f)

_800_

| State | Mobile device | Display |
|---|---|---|
| 801 — Session active, user is away from both IAX beacons | | Door locked |
| 803 — Session active, user's device detects outside IAX beacon (only) | | Door unlocked |
| 805 — Session active, user's device detects inside IAX beacon (only) | | Door locked |
| 807 — Session inactive, user's device detects inside IAX beacon (only) | | Door unlocked |
| 809 — Session inactive, user's device detects outside IAX beacon (only) | | Door locked |
| 811 — Session inactive, user is away from both IAX beacons | | Door locked |

Find your talk...

Room 3-21C
This time it's different: VR/AR adoption praxis

Room 1-12C
Regular exercise at the gym: Comparing wearable fitness trackers

Room 2-21B
Slower and more calculated: Helping knowledge workers get into the flow Room 3-2A
Favors for favors: Social media and reciprocity

⋮

1203

You are connected!

You are in Room 2-22A
Watch the parking meters: Wearables for city services

View slides

Live translation

Contact authors

FIG. 12

SYSTEM AND METHOD OF ACCESS CONTROL FOR SPACES AND SERVICES

BACKGROUND

Field

Aspects of the example implementations relate to methods, systems and user experiences associated with providing access control of spaces and services, and more specifically, apparatuses and methods for using inaudible audio waves to control access to spaces and/or services, particularly those that are session-managed.

Related Art

In the related art, there are proximity sensing technologies. For example, Wi-Fi, GPS and Bluetooth may be used to estimate a location of a device associated with a user.

However, for the related art proximity sensing technologies, there are various problems and disadvantages. For example, but not by way of limitation, the related art technologies for proximity sensing are not able to determine whether a tracked device or user associated with the tracked device is on one side of a wall or door, or the other (e.g., when very close to the wall or door). Therefore, for confined spaces, the related art proximity sensing technologies are not capable of determining definitively whether a device, and the user associated with the device, is within the confined space. In other words, the related art proximity sensing technologies cannot determine whether a user and his or her device are inside of a room having walls and door.

A reason why related art technologies cannot determine whether the tracked device or user associated with the tracked device is on one side of a wall and/or door, or the other, is because the difference in actual distance between being outside the space and inside a space may be less than the margin of error for those related art technologies. For example, many related art technologies have a margin of error of a foot or more, which is greater than the actual distance between outside and inside the confined space. This is because the related art technologies depend on estimated distance based on relative received signal strength (RSSI) or Round-trip delay time (RTT) of the electromagnetic field (EMF) waves, which permeate the boundaries or the walls and doors.

In one related art example, geo-fencing may be employed to unlock the door when a user's device is outside but in proximity of the lock, and automatically lock the door when the user's device is not in proximity of the lock. However, this related art implementation can result in various problems. For example, there is a related art risk of automatically unlocking the door when the user is inside and not outside because the related art locks rely on assumptions that lead to deterministic errors. For example, the assumption that the user went outside after opening the door may lead to an incorrect determination that the user is outside when the user is actually inside, or vice versa. The result can be that instead of unlocking the door when a user approaches from the outside, the door actually locks. Accordingly, related art approaches that use EMF are not able to accurately determine whether or not a user is inside of a room.

There are other related art technologies associated with proximity sensing, such as motion sensor, near field technologies (e.g., NFC), or very near field technologies, which determine actual presence in a space. However, these related art approaches may also have various problems and disadvantages. For example, not by way of limitation, the related art motion sensors cannot attribute presence to a particular device, or individual associated with the device. Further, near field technologies require users to use their credentials to actually badge into a room, accordingly this creates additional requirements in terms of entry and exit, or may produce state errors if the user forgets to badge in or badge out, for example.

Accordingly, there is an unmet need in the related art to reliably detect whether a device associated with a user is present on one side or the other side of a physical threshold, such as a wall or a door, so that a determination can be made whether the user is in a confined space.

SUMMARY

According to aspects of the example implementations, a method includes controlling access to an enclosed area having a boundary, comprising generating a first inaudible audio signal inside the enclosed area, and generating a second signal, each configured to be sensed by a sensing device, wherein the first inaudible audio signal is not capable of penetrating the boundary; determining a state of the enclosed area, based on either the first inaudible audio signal, or the first inaudible audio signal and the second signal, being sensed by the sensing device; and based on the state, generating an instruction to perform access control for the enclosed area.

Aspects of the example implementation also include the second signal comprising an electromagnetic frequency (EMF) signal capable of penetrating the boundary, or a second inaudible audio signal not capable of penetrating the boundary.

According to various aspects of the example implementation, at least one of the first inaudible audio signal and the second inaudible audio signal is generated by a device associated with the enclosed area, and the sensing device is coupled to a communication device associated with a user, or, the at least one of the first inaudible audio signal and the second inaudible audio signal is generated by a communication device associated with a user, and the sensing device is coupled to a device associated with the enclosed area.

According to still further aspects of the example implementation, the determining further comprises determining the state of the enclosed area based on the first inaudible audio signal or the second inaudible audio signal, and the EMF signal, being sensed by the sensing device, so as to provide an indication that a user is proximal to the enclosed area.

According to yet other aspects of the example implementation, the first inaudible audio signal and the second inaudible audio signal are generated by a first speaker and a second speaker, respectively, and include one or more bits of information associated with an origin of the first inaudible audio signal or an origin of the second inaudible audio signal.

According to some aspects of the example implementations, the first inaudible audio signal and the second inaudible audio signal comprise a first IAX beacon signal and a second IAX beacon signal, respectively.

According to further aspects of the example implementations, the sensing device is a microphone coupled to a mobile phone or a wearable device associated with the user.

According to other aspects of the example implementations, the generating the instruction comprises generating a command signal to lock a door associated with the enclosed area where the state comprises the second inaudible audio signal sensed by the sensing device and the first inaudible audio signal nonsense by the sensing device, or to unlock the door associated with the enclosed area where the state comprises the first inaudible audio signal sensed by the sensing device and the second inaudible audio signal not sensed by the sensing device.

Example implementations may also include a non-transitory computer readable medium having a storage and processor, the processor capable of executing instructions for controlling access to an enclosed area having a boundary, as well as a system for controlling access to a controlled-access environment having a boundary and an access point.

The controlled-access environment may include a telemedicine kiosk, wherein a patient may communicate information within the boundary and when the access point is closed; one of a plurality of presentation rooms, wherein each of the plurality of presentation rooms provides a plurality of respective different information services; and/or a presentation room, wherein the presentation room provides an information service within the boundary and when the access point is closed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 6(a)-6(f) illustrate an example usage of the example implementations for a workbooth.

FIG. 8 illustrates a mobile device and public display transition states according to an example implementation.

FIG. 12 illustrates a conference presentation in accordance with the example implementation

DETAILED DESCRIPTION

Figure 1A:
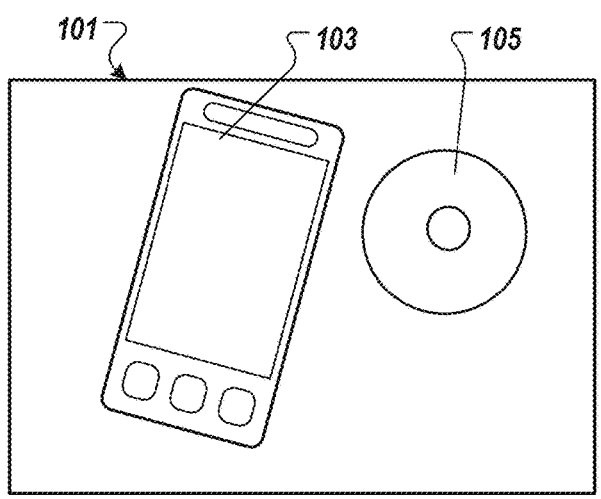
FIGS. 1(a)-1(b) illustrate related art approaches to detection of presence on threshold boundaries.

The following detailed description provides further details of the figures and example implementations of the present application. Reference numerals and descriptions of redundant elements between figures are omitted for clarity. Terms used throughout the description are provided as examples and are not intended to be limiting.

For example, but not by way of limitation, the term "confined space" as used herein may refer to any volume having an entrance and a boundary so as to create an interior portion and an exterior portion. The boundary may be a wall, ceiling or the like that is permeable to EMF, and the entrance may be a door or the like. Further, the term "workbooth" refers to a confined space that is configured for a user to enter and close, such that the user may perform one or more tasks within the closed, confined space.

In contrast to the related art approaches of EMF, motion sensor or near field technology for confined space access control, the example implementations take an approach that employs soundwaves. For example, unlike EMF ways, soundwaves are more likely to not penetrate the wall and door boundaries associated with a confines raise, and thus, may be more useful for threshold boundaries situations than the related art technologies. Additionally, unlike near field technologies, the use of soundwaves does not require any specific user actions to change access control based on a state change. The soundwaves may also transmit small amounts of data over short distances, which can provide additional information and a short range that is not possible with near field technologies or motion sensors.

More specifically, the related art approach takes advantage of inaudible soundwaves, also referred to as "audio waves". At frequencies above 20 kHz, soundwaves may be inaudible to a human ear, although they can still be picked up by sensing devices, such as off-the-shelf microphones. Such soundwaves, which are inaudible to the human ear but can be sensed by existing audio detection devices such as microphones, may be referred to as "inaudible audio".

The present example implementations use inaudible audio begins to detect the presence of a device that is associated with a user, and to permit determination as to whether the device, and the associated user, is present on one side or the other side of a physical threshold, such as a wall or a door. In combination with a scheduling system, such as an external scheduling system, a determination may be made as to whether a door to a confined space is to be locked or unlocked for a particular user associated with a device, at a given time. Optionally, the inaudible audio beacons may be combined with EMF—based proximity services.

Accordingly, the inaudible audio waves, such as ultrasonic waves, may be transmitted and received between a beacon that is positioned inside the threshold, a beacon that is positioned outside of the threshold, and a mobile device associated with a user, such as a mobile phone or wearable device, for example, configured to sense an output of the beacon. Alternatively, the position of the beacon and the sensor may be reversed, such that the beacon is on the device associated with the user, and the sensor is positioned inside or outside of the threshold.

Thus, the example implementation employs beacons that generate an output signal that is inaudible, ultrasonic, and capable of providing data, referred to herein as "Inter-Asterisk eXchange beacons" or "IAX beacons". BLE (Bluetooth Low Energy) beacons, like the original Bluetooth specification, employ a radio frequency-based communications approach. Also, like Bluetooth, BLE devices utilize 2.4 GHz frequencies, but use fewer channels and less power than Bluetooth. In the present example implementations, IAX beacons are used, which rely on audio-based communications, and specifically those audio waves that are inaudible to humans (e.g., ultrasonic). Audio waves are entirely different from the radio waves upon which BLE is based. Thus, where described herein, unless indicated otherwise, the term "beacons" generally refers to IAX beacons (e.g., beacons that rely on audio-based communications, and specifically those audio waves that are inaudible to humans (e.g., ultrasonic)), and not BLE beacons, or other beacons. It is noted that the IAX beacons are distinguishable from other beacons, such as BLE beacons. However, any audio wave generating device that is capable of transmitting the inaudible, ultrasonic, data containing information may be used, including but not limited to speakers, for example.

In connection with a scheduling service, such as an external service, a current session state associated with a user may be provided, which is indicative of whether or not the session of the user is currently active. Further, the session information may be used to connect a lock management service, such as an external service, that controls a lock of a door associated with the confined space, and also displays the state of the door, for example locked or unlocked, on the interior and/or exterior of the confined space or workbooth.

Figure 1B:
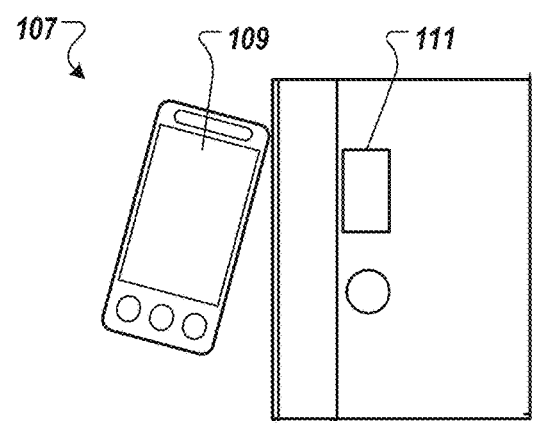

FIGS. 1(a) and 1(b) illustrate related art approaches 100 to access control of a confined space. As shown in FIG. 1(a), at 101, a mobile computing device 103 having an online application is configured to communicate with a lock 105 via near field communication when the mobile computing device 103 transmits a near field signal based on a communication from a user, lock 105 (e.g., on a door) command, and locks or unlocks, depending on the command.

As shown in FIG. 1(b), at 107, a mobile computing device 109 is provided with an online application, in response to a signal transmitted from the online mobile application. In response to a user input for example, a lock 111 on a door that is an entry to a house or the like (for example, having an entry keypad or hardkey interface) may receive a signal, and the door may lock or unlock. However, as explained above, this related art approach requires the user to actively request a locking or unlocking action; moreover, state errors may occur if, for example, a user fails to perform the action, such as forgetting to lock the door upon leaving, or inadvertently unlocking the door when outside, and then locking the door when inside.

Figures 2A, 2B, 2C:
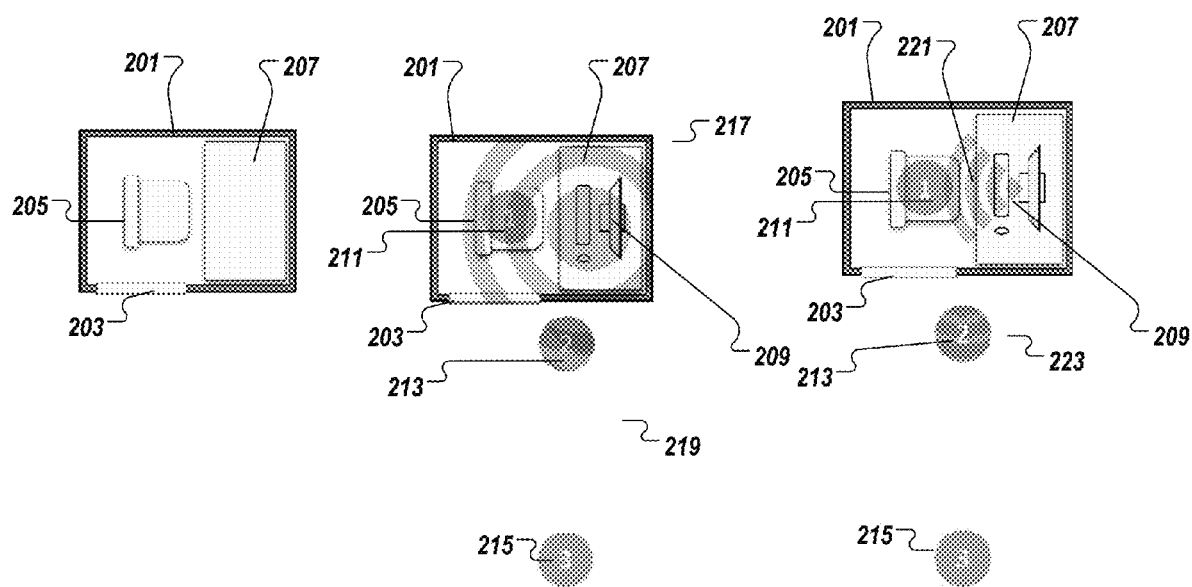
FIGS. 2(a)-2(c) illustrate various problems and disadvantages that may be associated with related art approaches, in comparison with the example implementations.

FIGS. 2(a)-2(c) illustrate the foregoing related art issues, in comparison with the example implementations, at 200. As shown in FIG. 2(a) a confined space having no proximity sensing is provided. More specifically, one or more walls 201, in combination with an entry such as a door 203 are provided, with an interior which may have an area 205, such as a chair, for the user to be positioned when inside the confined space, as well as a working region 207. There is no proximity sensing, and any entry or exit may be accomplished, for example, by party or physical key.

FIG. 2(b) illustrates the approach according to the related art. For the confined space for the workbooth, one or more walls 201 are provided in combination with a door 203 to create the confined space. As explained above, an area 205 is provided for a user to be positioned, as well as an area 207 that is a working region. In this example implementation, a computing device 209 is provided at the working region 207.

At 211, a device associated with a user is inside the workbooth, generating electromagnetic waves 217. When the device associated with the user is moved from 211 to 213, such as when the user is outside of workbooth, electromagnetic waves 219 are generated. At 215, the user is far away from the workbooth. Because the electromagnetic waves generated from inside the confined space can be sensed outside of the confined space by the mobile device associated with the user, and vice versa, there is a risk of incorrect location determination with respect to the boundary or wall. Thus, the related art approach does not permit accurate detection of threshold boundaries.

FIG. 2(c) illustrates a system for threshold boundary detection according to an example implementation. As noted above, one or more walls 201 and an attached door 203 form a threshold boundary of the confined space. A user area 205 and a working region 207 are provided, the working region 207 optionally including a computing device 209.

At 211, a device associated with the user is inside the workbooth, such as a personal computer, generating inaudible audio waves 221. When the device associated with the user is moved from 211 to 213, such as when the user is outside of the workbooth, inaudible audio waves 223 are generated by a device external to the workbooth. At 215, the user is far away from the booth. Because the inaudible audio wave 221 generated inside the confined space does not penetrate through the wall or door of the confined space, and vice versa for the inaudible audio wave 223 generated outside the confined space, accurate detection of threshold boundaries may be performed.

Figure 3A:
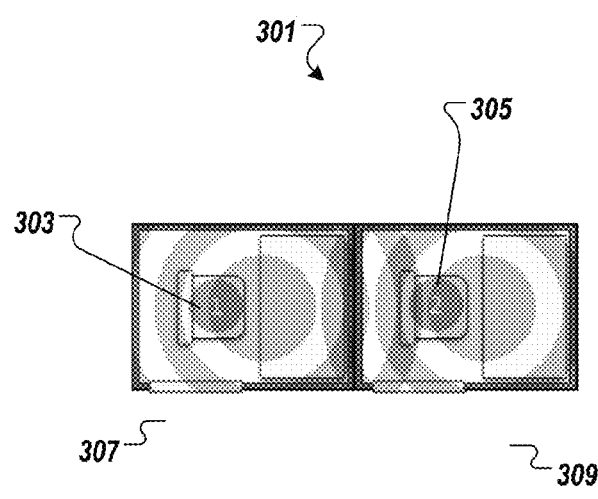
FIGS. 3(a)-3(b) illustrate various problems and disadvantages that may be associated with related art approaches, in comparison with the example implementations.
Figure 3B:
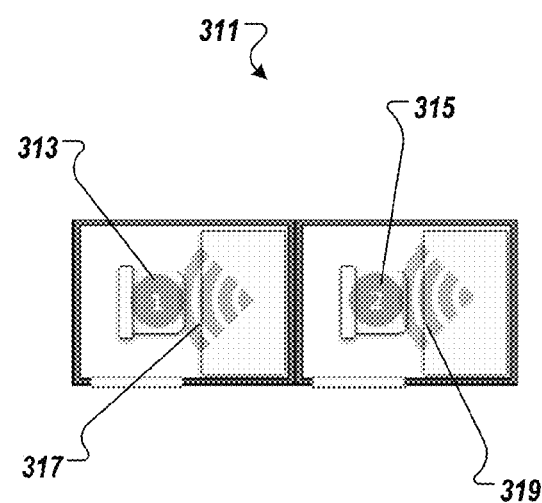

FIGS. 3(a) and 3(b) illustrate an example implementation in which workbooths are adjacent to one another at 300. More specifically, as shown in FIG. 3(a), at 301 a related art EMF based threshold detection system is employed. A first device 303 and a first user are in a first workbooth, and a second device 305 and a second user are in a second workbooth. The first workbooth and the second workbooth each share at least one common wall. A beacon positioned inside of the first workbooth (e.g., at first device 303) generates EMF signals 307, and another beacon positioned inside of the second workbooth (e.g., at second device 305) generates EMF signals 309. Because the EMF signals of the two workbooths overlap with one another as the EMF signals pass through the walls, the related art approach does not permit accurate determination as to which user is in which workbooth.

In contrast, as shown in FIG. 3(b) at 311, a first device 313 associated with the first user in a first workbooth is adjacent to, and sharing a wall with, a second device 315 associated with a second user in a second workbooth. A beacon in the first workbooth generates an inaudible audio signal 317, and a beacon in the second workbooth generates another inaudible audio signal 319. In this example implementation, the inaudible audio signals do not pass through the physical threshold, such as the wall or the door. Further, the signals for each of the first and second workbooth have different characteristics (e.g., frequency or amplitude), such that the first user would only be able to use the first workbooth and the second user would only be able to use the second workbooth, so as to avoid the risk of a user entering the wrong workbooth. Thus, accurate determination as to which user is in which workbooth can be performed.

Figure 4:
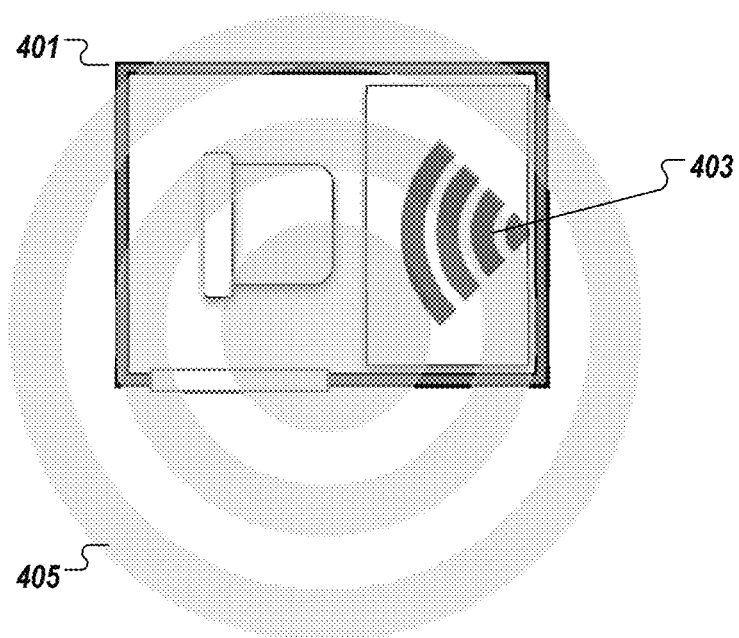
FIG. 4 illustrates an example implementation combining a first determination mode and a second determination mode.

FIG. 4 provides an illustration of another example implementation at 400. One or more walls and a door are provided to generate a confined space, in which a user may be positioned, and a work region may be provided, as explained above. Further, the confined space includes a beacon that generates an inaudible audio signal 403, as well as a device that generates an EMF signal, or a Bluetooth signal 405 (e.g., a signal that can penetrate the boundary of the enclosed space). Thus, an interior ultrasonic sensor that receives inaudible audio signals limited by the boundary of the enclosed space may be combined with a Bluetooth sensor or the like that receives signals not limited by the boundary of the enclosed space, to provide a determination that a user is generally in a vicinity of the workbooth, as well as providing a determination as to whether the user is inside or outside of a particular space. Thus, the circumstance where it is necessary to determine whether a user is in a vicinity of the workbooth, without interfering with the ability to determine whether the user is inside or outside of the workbooth, while at the same time allowing for a determination as to whether the user is inside or outside of the workbooth.

Figure 5:
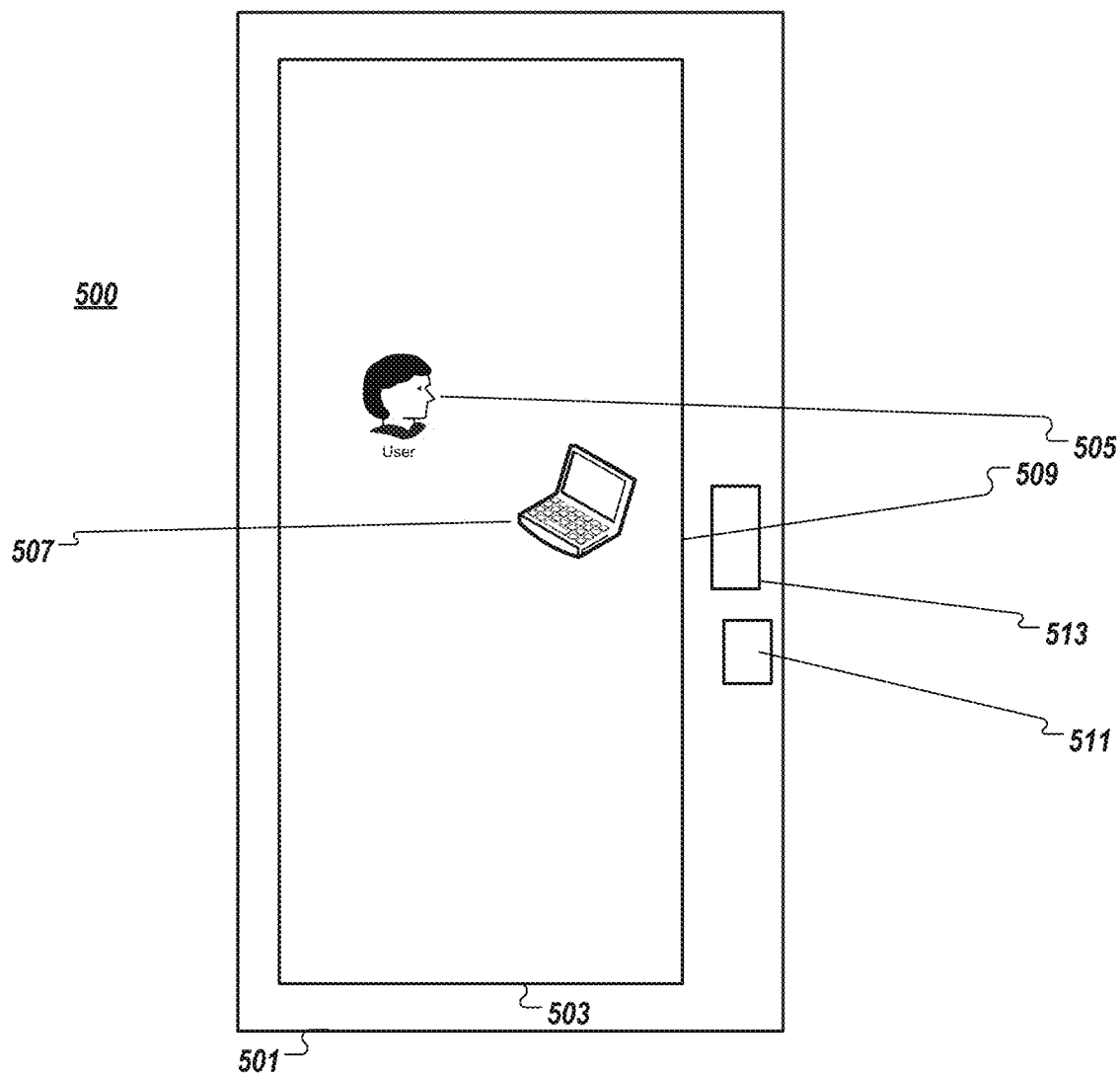
FIG. 5 illustrates a workbooth according to an example implementation.

As explained above, an example implementation is directed to the confined space associated with a workbooth, for example but not by way of limitation, a personal workbooth. One example personal workbooth is shown in FIG. 5 at 500. Accordingly, the system is configured to connect, or be coupled to, an external service that is capable of indicating whether a user associated with a user device has access to the workbooth.

For example, the structure of the workbooth may include one or more walls 501, and a door 503 that interfaces with the one or more walls 501 to define the confined space therein. Within the workbooth, a user area 505, where in this case a user may sit and work, and a work region 507, which in this case houses a computing device. Further, an access module is provided at 511, and an interface is provided at 513. According to the example implementation, the access module 511 may include a beacon, and the interface 513 may include an indication as to whether or not the door is locked, upcoming schedule information, with the permission of the user, user information, or the like.

As shown in FIG. 6, the example implementation is configured to be interoperable with a device associated with a user, such as a mobile computing device, watch or other device that can be associated with the user, so long as the device is capable of receiving the inaudible audio signal. As explained above, the inaudible audio signal can be sensed by a microphone, such as a microphone on a mobile computing device. Thus, a user having a mobile computing device with a microphone can use the example implementation of the workbooth.

At 600, various states associated with the workbooth are illustrated. At 601, a session is active. More specifically, a door 605 is closed, and a display device 603 provides an indication that the door is locked. The user is not inside of the confined space. At 611, a user approaches the workbooth. The display 613 provides a message that the door is unlocked, such that the user can open the door 615. The user then enters the workbooth, and as shown at 621, the user is working, for example, on a personal computing device such as a laptop, and at 623 a message is provided for the user, so that the user is aware that the door is locked. At 631, the user is exiting the workbooth, and the display 633 indicates that door is unlocked, as the user opens the door at 635. At 641, and indication is provided by display 643 that the door is locked, and the door is shown to be locked at 645. At 651, the user is in the workbooth, but as shown at 653 an indication is provided that the door is locked.

As shown in the above example, as the user approaches the workbooth, a device associated with the user, in this case the user's watch, senses the ultrasonic audio signal at 601, and unlocks the door at 611. When the user settles into work at 621, the system locks the door automatically. If the user decides to leave during a session as shown at 631, the system automatically locks the door once the users out of range, as shown at 641. When the session of the user has been completed, the system provides a notification along with an audio notification, and unlocks the door, as shown in 651.

Figure 7:
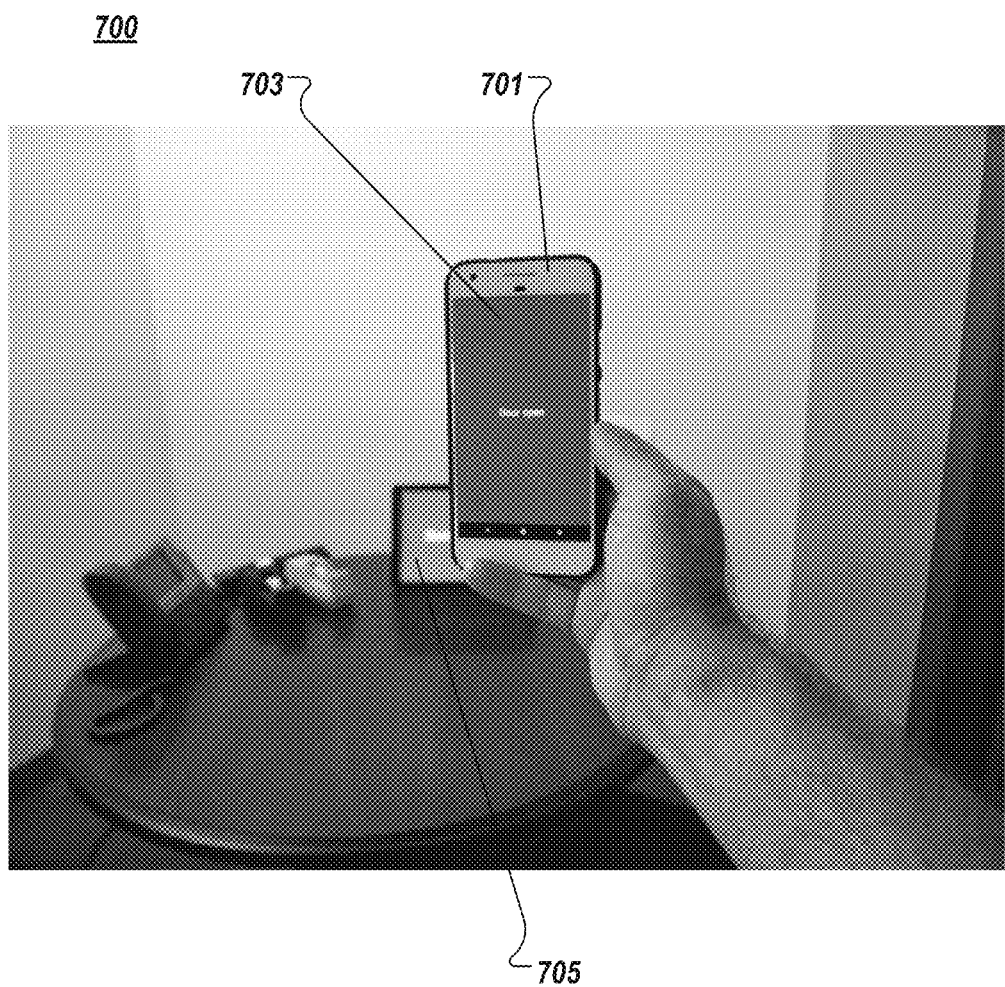
FIG. 7 illustrates an example implementation that employs a mobile computing device.

FIG. 7 illustrates an example implementation 700 that includes a mobile device. More specifically, a mobile device 701, in this case a smart phone, includes an interface 703, which is configured to sense a signal received from the beacon at 705. Thus, the mobile device 701 includes a microphone that receives the inaudible audio signal, and in response thereto, generates the output at 703.

As explained above, the example implementation may include one or more states associated with a mobile device and a display, as well as the beacon of the system. For example, but not by way of limitation, as shown in FIG. 8, at 800, a plurality of states 801-811 are illustrated.

In a first state 801, the session is active, and the user is away from both IAX beacons. According to this state, an indication is provided at a mobile device associated with the user, that the user is away from the workbooth; the display provides instruction for the user to proceed to the workbooth. At the same time, a display at the entrance to the workbooth provides an indication that the door is locked. Thus, the user is notified by the system to proceed to the workbooth.

At 803, the state of the system is such that the session is active and the user is still outside of the workbooth, but in the vicinity of the workbooth. Thus, the device associated with the user detects the IAX beacon that is positioned outside of the workbooth. Because the user is outside of the workbooth, the mobile device displays a message indicating that the session is active, and that the user should enter the workbooth. The display indicates that the door is unlocked. Thus, the system unlocks the door for the user to enter the workbooth.

At 805, the state of the system is such that the session is active, and the device associated with the user only detects the IAX beacon that is positioned inside the workbooth. More specifically, the IAX beacon positioned inside the workbooth generates an inaudible audio signal that is detected by the microphone of the device associated with the user, such that the device associated with the user indicates that the session is active. The display on the outside of the workbooth indicates that the door is locked. Thus, the system locks the workbooth, and the user is inside of the workbooth, in a session.

At 807, the state of the system is such that the session is inactive, and the device associated with the user detects only the IAX beacon that is inside of the workbooth. Based on the signal received by the microphone of the device associated by the user, in the form of an inaudible audio signal from the IAX beacon inside the workbooth, a device associated with the user generates a display indicating that the session is now inactive, and that the user should exit the workbooth. Further, the display that is external to the workbooth indicates that the door is unlocked. Thus, the system unlocks the door for the user, and notifies the user that their session is over.

At 809, the state of the system is such that the session is active, the user has departed workbooth, and thus, the device associated with the user can only detect the IAX beacon that is located outside of the workbooth. Based on the message provided by that external IAX beacon, the device associated with the user receives a signal and displays an indication that the session is inactive, and that the user should wait. The external display provides the indication that the door is locked. In this situation, because the session is inactive, the system ignores the user in this specific circumstance.

At 811, the state of the system is such that the session is inactive, and the user has moved away from the workbooth, such that the user is outside the range of the IAX beacons. At this point, the device associated with the user is not receiving a signal from the IAX beacons, and is instead only displaying an indication that device associated with the user is away from the IAX beacons. Further, the display at the workbooth indicates that the door is locked. Because the session is inactive and the user is out of range, the system ignores the user in this specific circumstance.

The foregoing example implementation indicates that the display is provided external to the workbooth. However, the same display is also configured to be provided internal to the workbooth, such that the user is aware of the display that is being provided outside of the workbooth, and is thus aware of the state of the door, as being locked or unlocked.

In the above example implementations, a default state of the system is that the door will remain locked. Further, in an edge case in which the door is opened, as the user is entering or exiting, it is possible that the device associated with the user might be able to simultaneously detect both the internal IAX beacon and the external IAX beacon. However, because the door of the workbooth is open, the system is inactive by default at this point.

In the above example implementation, there may be a plurality of closely co-located workbooths. In such a situation, the system will include states where the device associated with the user detects the correct IAX beacon, and a state where the user is in the wrong workbooth, and the wrong IAX beacon is detected. However, as explained below, because the inaudible audio signal may also include data, and identity of the workbooth may be validated by the device associated with the user, or vice versa.

Further, as explained above, an ultrasonic beacon may be used in combination with an electromagnetic wave based technology (e.g., RF signal-based), to determine the threshold boundary crossing. For example, but not by way of limitation, the ultrasonic sensor may be located inside of the confined space, and combined with a Bluetooth sensor, to determine that a user is generally in the vicinity, using Bluetooth detection techniques, and that the user is inside or outside of a particular confined space, by use of the ultrasonic sensor within the confined space. As also explained above, the beacons may be configured as receivers, such as microphones, for the situation where a device associated with the user transmits the inaudible audio signal, without departing from the inventive scope described herein.

The example implementations described herein use inaudible audio signals that are generated by either the beacons at the confined space location, or the device associated with the user, depending on the configuration. According to one example implementation, the inaudible audio that is generated may be ultrasonic audio. More specifically, two IAX beacons may be used, one internal to the confined space and the other external to the confined space. A beacon can be any device that has an audio output, such as a stereo output. For example, a tablet display having a stereo or speaker system, may be a beacon. Further any device with a microphone and the necessary signal processing online application, such as software, or a non-transitory computer readable medium containing instructions, can receive and process the signal.

Further, the state may be determined based on timeouts, in other words, when a prescribed time as expired, a state may change. Further, a presence of a device associated with a user that is either internal or external and detected based on the beacon and sensor, may also be used to determine the state.

According to one example implementation, an open-source platform (e.g., Chirp.io) is used to send and receive the ultrasonic data, or inaudible audio signals. This platform is configured to be able to receive the signal in environments that are considered "noisy", such as public areas, train stations, outdoors, etc. The system also transmits messages having a length of eight bytes. However, the example implementation is not limited thereto, and a range of 8 to 16 bytes may be provided such that the system keys specific to the user, and can determine compatibility. Further, the example implementation does not require a network connection, and can therefore be operated in areas or situations that do not have Internet connectivity. For example, the example implementation may be employed where there is background music, such as in a café setting, as well as in a standard teleconference meeting, without departing from the inventive scope of the example implementations.

As noted above, the IAX beacons may transmit short messages (e.g., to arbitrary hexadecimal characters), and may use a delay to detect absence. The example implementations may transmit messages that are longer, including but not limited to up to 16 hexadecimal characters (e.g., eight bytes) in length. Accordingly, the example implementation may prevent potential "man in the middle" attacks, by employing keys that are transmitted by each of the interior and exterior microphones, which are generated specific to each user/door pair (e.g., user/booth pair, and session combination for the case of workbooths).

Figure 9:
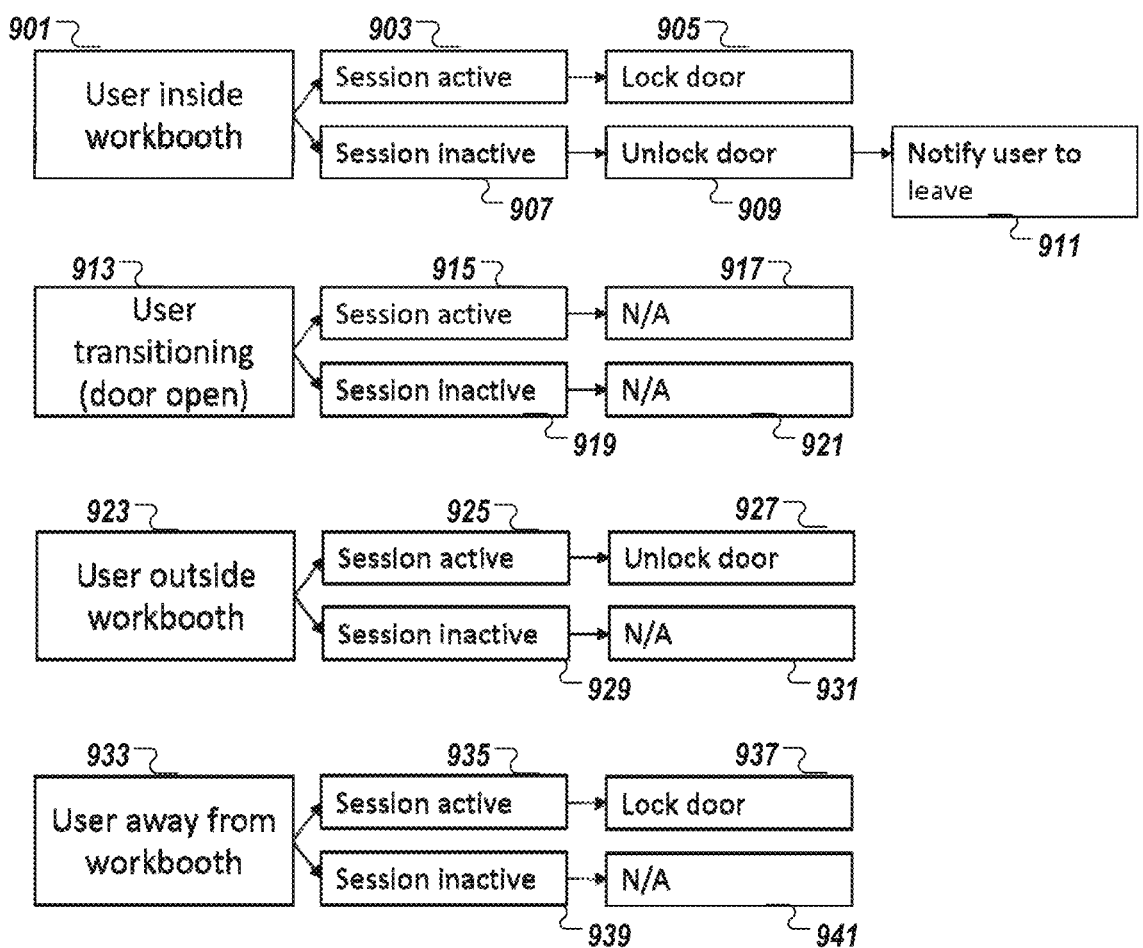
FIG. 9 illustrates system states that transition according to an example implementation.

FIG. 9 illustrates the above described states according to an example implementation in 900. At 901, a user is inside a workbooth, as indicated by a device associated with the user receiving a signal from a beacon, and processing that signal to provide a state output. The example implementation may determine whether the session is active at 903, or that the session is inactive at 907. If it is determined that the session is active at 903, the doors locked at 905, and as indicated above, the appropriate display messages are provided to the display, and may be viewed by the user. If it is indicated that the session is inactive at 907, the door is unlocked at 909, and a notification is provided to the user, via the device associated with the user that receives the inaudible audio signal, at 911.

At 913, a user is transitioning such that the doors open, and the user is either entering or exiting the workbooth. For the determination that the session is active at 915, the signal is ignored at 917 because the sensor detects the output of both the internal beacon and the external beacon. Similarly if it is determined that the session is inactive at 919, the result is ignored at 921 and no action is taken. Thus, during the user transition process, the door will not become locked or unlocked, because the user is traversing the door.

At 923, a user is outside the workbooth. For the determination that the session is active at 925, the door is unlocked and the user may enter. For the determination at 929 that the session is inactive, no action is taken at 931, because the user is not associated with an active session.

Similarly, at 933, the user is positioned away from the workbooth. If a determination is made at 935 that the session is active, the door is locked at 937, because the user is not in the vicinity of the workbooth. On the other hand, if the determination is made that the session is inactive, and the user is not in the vicinity of the workbooth at 939, no action is taken at 941.

The foregoing example implementations are primarily directed to controlling physical access. However, the example implementations are not limited thereto and other example implementations may also be employed. For example, but not by way of limitation, the inaudible audio may be used to control access to services.

Figure 10:
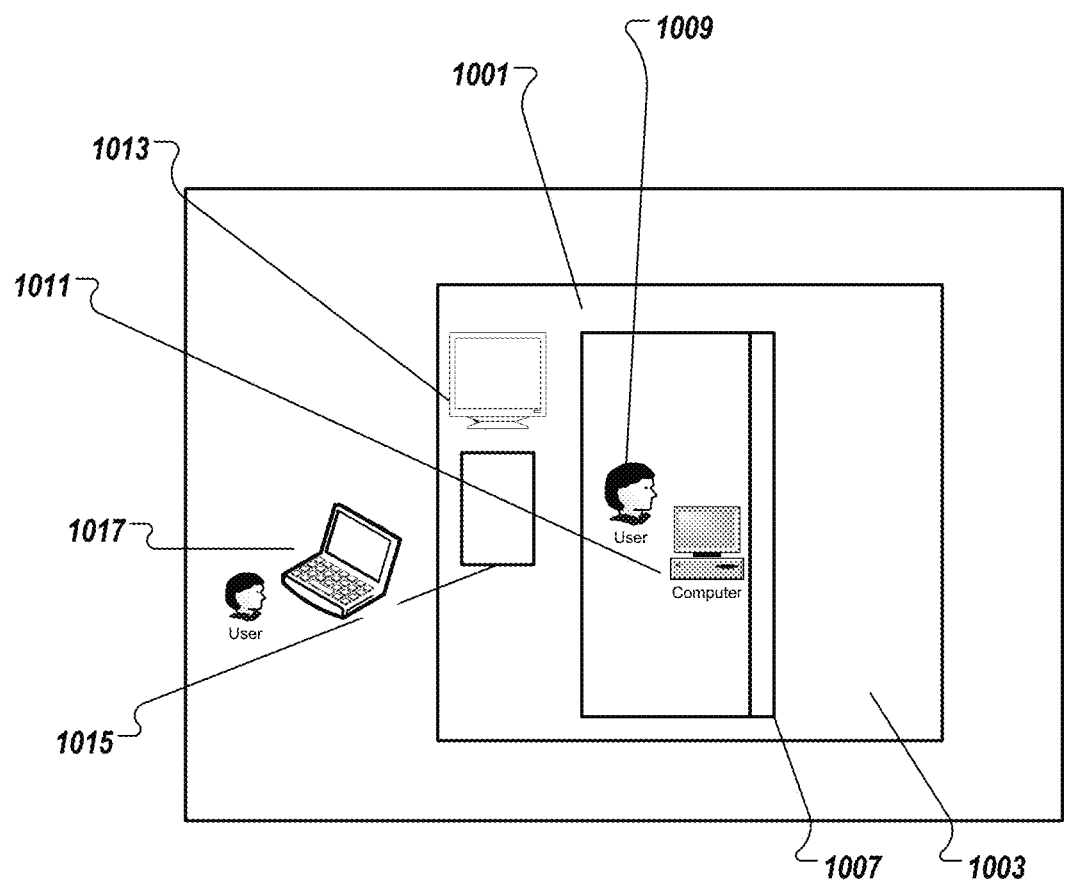
FIG. 10 illustrates a telemedicine kiosk that employs the example implementation.

FIG. 10 illustrates access to services by use of inaudible audio according to an example implementation. More specifically, a telemedicine kiosk is provided. There is an increasing need to communicate data between personal devices and medical kiosks. In the related art, such information was communicated by way of Bluetooth or other broadcast mechanisms. However, there may be related art problems and disadvantages, such as the possibility of data leakage outside of a telemedicine kiosk, as well as potential issues associated with speed.

Such problems and disadvantages in the related art have made it impractical to use telemedicine kiosks in many situations. For example, but not by way of limitation, because a majority of doctor visits are very short (e.g., average time of about 17 minutes), the doctor must have basic information regarding the patient's medical history, including information such as test results, past or current prescriptions, or the like, prior to making a diagnosis. Because a physical doctor may be present at a traditional doctor's office, the information may be obtained securely.

However, in the context of a telemedicine kiosk, it is not possible for a doctor to be present to ensure that the information is quickly and securely received, so as to permit a timely diagnosis. Instead, the information must be sent from a patient via a wireless network. As a result, there is a problem or disadvantage, in that bad actors may intercept the data. Further, although information could be encrypted on a device associated with the user, such as a mobile device or smart phone, this process is often too slow or impractical.

According to the example implementation, information is communicated between the patient and the booth via ultrasonic communication. Accordingly, the booth is then used to encrypt and send the data of the doctor over a wireline network, for example, so as to provide a high level of security and privacy, without requiring users to necessarily encrypt their data.

As shown in FIG. 10 at 1000, a kiosk 1001 is provided. Further, an external wall 1003 is connected to a door 1007 (e.g., physical access point to kiosk 1001), which can be closed, such that a beacon inside of the kiosk transmits and inaudible audio signal, such as an ultrasonic signal, that cannot be received outside of the walls of the kiosk. Inside the kiosk, there is a user area 1009 and a work area 1011. Further, an interface is provided as a display at 1013, an input or output at 1015, which may include beacons as explained above, and a space at 1017 for a specialist to be present, or for a next user to wait.

The example implementation herein employs the above described system, with an internal beacon and an external beacon, each of which transmits the inaudible audio signal. In this example implementation, the inaudible audio signal transmitted by the internal beacon may be received by the microphone of the phone, and contain some information, as explained above. That information may be provided directly to the doctor, or other relevant parties in a secure manner. Thus, the access of control to the telemedicine service is based on the signal generated by the beacon, and a state engine as explained above may be modified and employed in this example implementation to restrict access to sensitive patient information by others.

Figure 11:
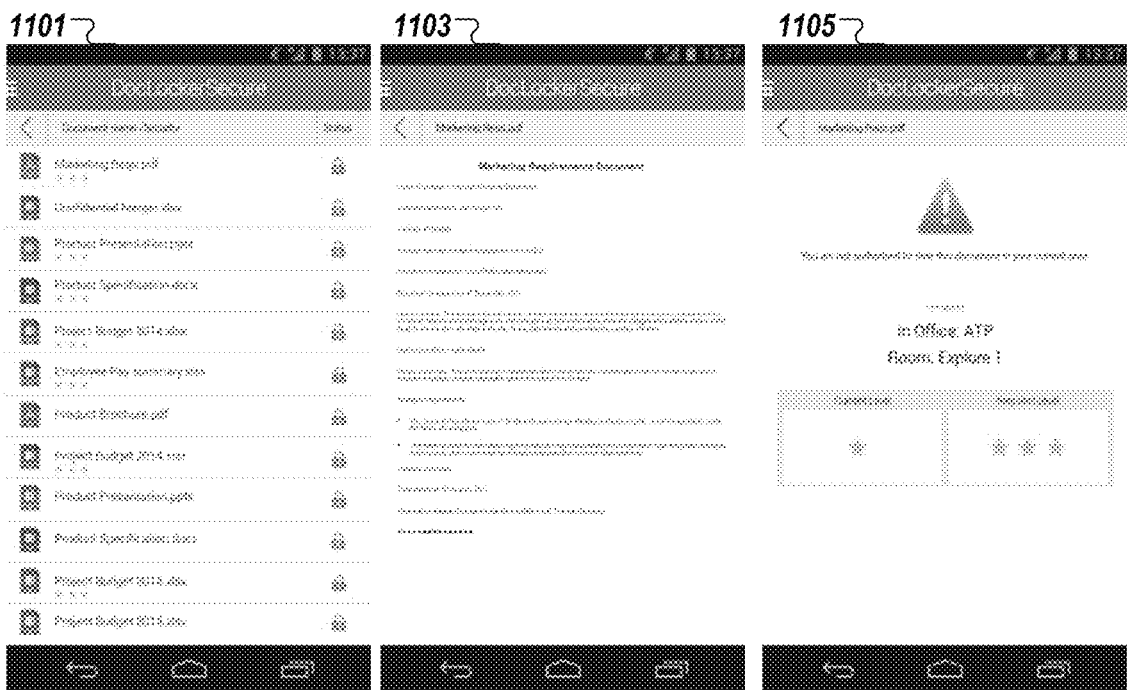
FIG. 11 illustrates a user experience associated with the example implementation.

FIG. 11 illustrates an example implementation of control of access to secure documents according to the example implementation, further details of which are disclosed in U.S. patent application Ser. No. 14/580,175, published as U.S. Patent Application Publication No. 2016/0182529, the contents of which is incorporated herein by reference in its entirety. More specifically, at 1100, a user interface is provided. Access is restricted to documents, based on indoor localization, using the above described system of beacon transmitting inaudible audios signal to a microphone associated with mobile device of user, or vice versa. In conjunction with the foregoing example implementation disclosed in FIG. 10, this approach could be used to preserve the privacy of medical documents or records.

More specifically, route-level indoor localization is provided, to provide secure, location-based access to documents. Using EMF based approaches such as Wi-Fi, Bluetooth, GPS or the like, bad actors may potentially access information or documents when in the vicinity of a secure room due to signal leakage. However, when using the above described ultrasonic approach, or inaudible audio signal, access to the secure document is limited to those users that receive the signal from the beacon, which does not leak from the secure room. Thus, information can be secured, such as the list of documents and 1101, access to the document itself at 1103, and an indication that access is denied based on location, and optionally, credential as determined by the relationship between the signal received from the beacon and the identity of the device associated with the user.

FIG. 12 illustrates an example implementation providing access to a conference presentation according with the example implementation. In the related art, conferences may provide additional services for talks. However, at a large conference with many rooms and many presentations that are simultaneously occurring, it may be difficult to identify the room and talk that is desired, or the room and the talk in which the user's position. As a result, valuable conference time may be lost while the user is attempting to determine the room and the talk, and by the time the user makes the determination, the user has to quickly come up to speed on the material, and is often behind and lost in terms of the presentation content.

According to the example implementation at 1200, the use of inaudible audio signals in each of the conference rooms, in a manner analogous to the adjacent workbooths, permit a user having a device with an online application to be able to receive a signal from a beacon in a room in which the talk is being given. More specifically, the mobile device receives the inaudible audio signal, and is able to access information associated with the talk in the room. Because the inaudible audio signal cannot be transmitted beyond the walls and door of the room, there is no related art problem of being in one room, and receiving information associated with the presentation in another room.

At 1201, an interface is provided that permits a user to find their talk. In this case, a plurality of room numbers and talk titles are provided. At 1203, a user enters a room, and the device associated with the user receives the inaudible audio signal from the beacon in that room. Based on that signal, the device associated with the user is able to determine the association between the room number and the talk, and the user does not have to manually perform this task, either online or using pamphlets or brochures. Thus, the user can immediately participate in the talk, viewing the slides, receiving a translation, asking questions, contacting the authors, etc.

Figure 13:
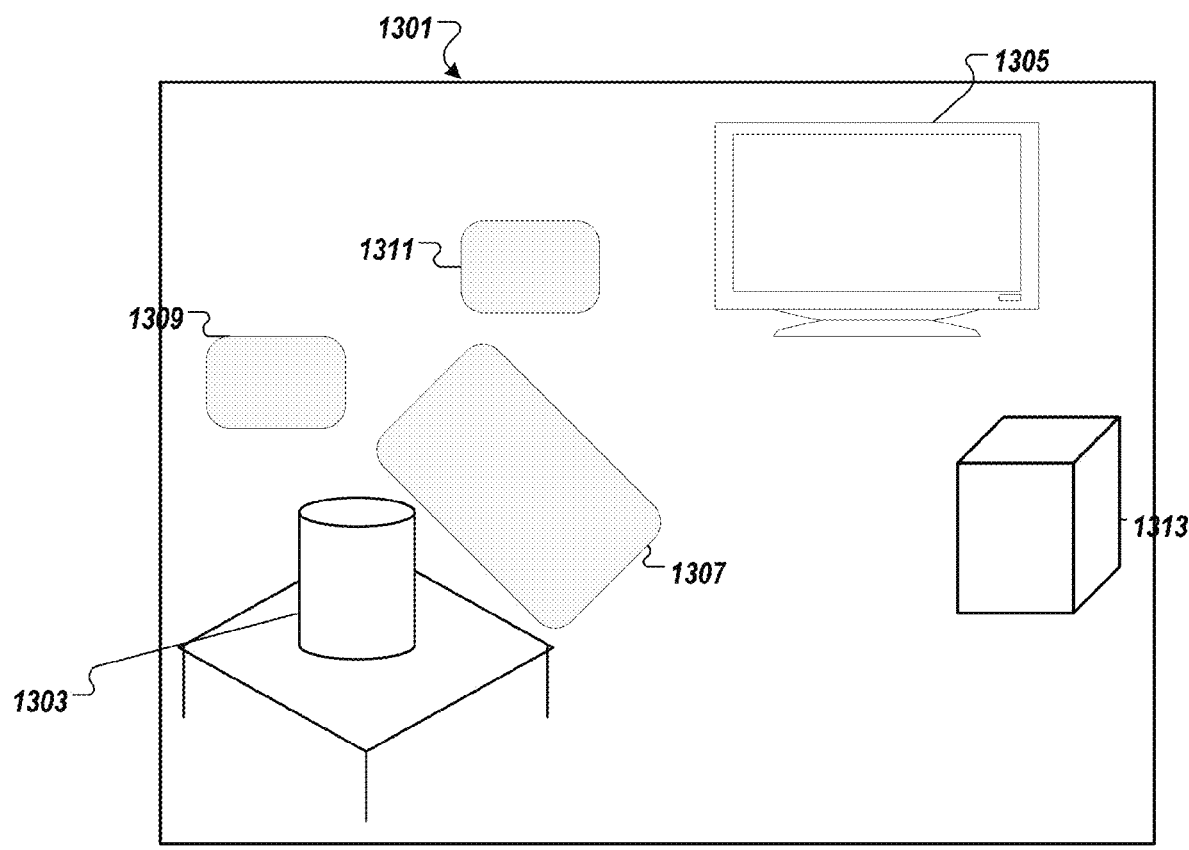
FIG. 13 illustrates an example of room based music differentiation, in accordance with the example implementation.

FIG. 13 illustrates room based music differentiation according to an example implementation. In the related art, homes and workspaces may share a common music service. However, one or more users may wish to play different music in different rooms of a home or in office. However, the user may not be able to determine the room that the user is currently in with respect to other music is being provided. Thus, the concept of selectively determining to play music in a room is complex, and the related art systems may be hacked by bad actors, so that users in one part of a house or office may play unwanted music in a different part of a house or an office.

As shown at 1300, in a room 1301, bidirectional communication device 1303 is provided, as well as a display 1305. Further, a speaker 1313, as well as sitting area 1307, 1309 and 1311 are provided. In this example implementation, using a combination of mobile devices each associated with a user and IAX beacons, the example implementation may be configured to play music in a current room, and only in that current room, with a single user action. For example, a beacon may be provided in a room, or a household communication device with a speaker and a microphone, may be configured to be a beacon. Thus, the beacon would transmit a signal to devices associated with the users, such that one or more users may play different music in different portions of a house without having that music be played by other users or for other users in other parts of the house where the music is not desired to be played.

Figure 14:
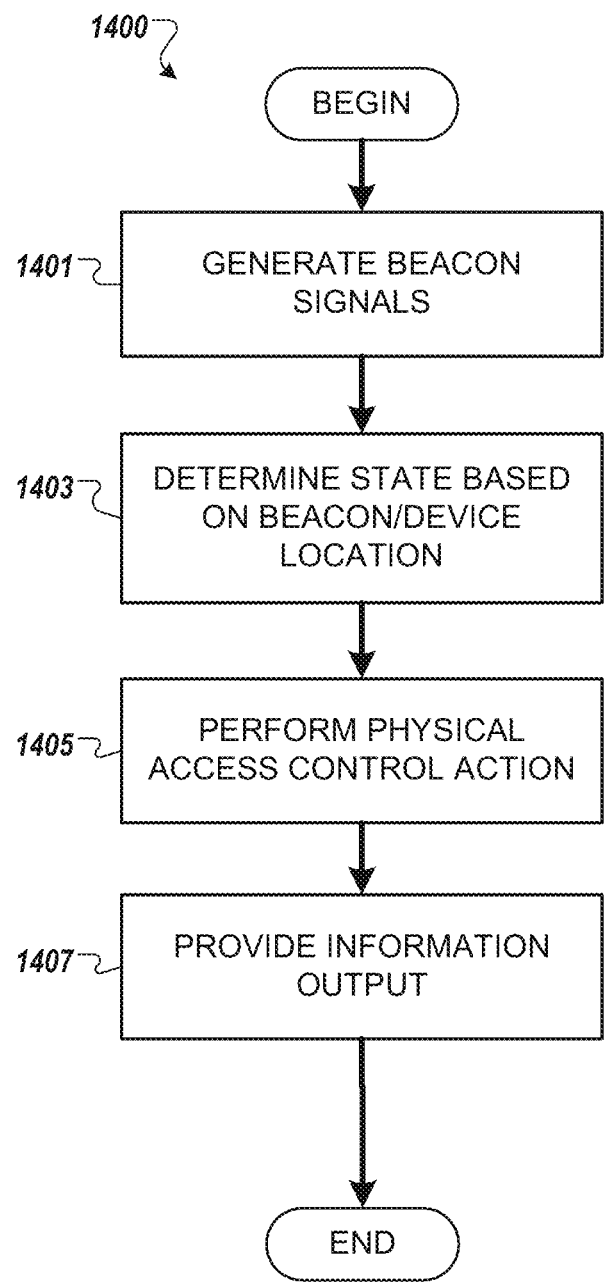
FIG. 14 illustrates a method in accordance with the example implementations.

FIG. 14 illustrates an example process 1400 according to the example implementations.

At 1401, an internal beacon signal and an external beacon signal are generated, the signals being configured to be received by a device associated with the user. As explained above, this can be a speaker that generates an ultrasonic signal that is configured to be received by a microphone of device associated with a user, such as a wearable, mobile phone, etc. Further, the external beacon signal can be substituted with a second signal that is EMF-based, as explained above.

At 1403, a state is determined, based on whether the device associated with the user is away from both beacons, detecting only the external beacon, or detecting only the internal beacon. For example but not by way of limitation, these states may correspond to the states described above and illustrated in FIGS. 8 and 9.

At 1405, based on the determine state, and action is performed with respect to physical access to the confined space. For example, if the session is active and the user is away from both beacons, or the session is active and the user is determined to be inside the confined space based on the device associated with the user detecting the internal beacon, or if the session is determined to be inactive, the door is locked. On the other hand, if it is determined that the session is active, and the device associated with the user detects the external beacon, or if the session is determined to be inactive, and the device associated with the user detects the internal beacon, then the door is unlocked, such that the user can enter in the case of active session, or exit in the case of inactive session.

At 1407, based on the foregoing state and action combination, the inaudible audio signal provided to the mobile device causes an appropriate message to be displayed to the user at the device associated with the user. For example but not by way of limitation, these displays are provided in 801-811. Further, the online mobile application, either at the device associated with the user, or remotely processed and provided as an instruction to the device associated with the, provides the content and other parameters associated with the delivery of the communication to the user. For example but not by way of limitation, if the user is inside the workbooth and the session is determined to be inactive, and the door is unlocked at 1405, then at 1407, the user may be notified that the session is inactive, and it is time to leave the workbooth.

Figure 15:
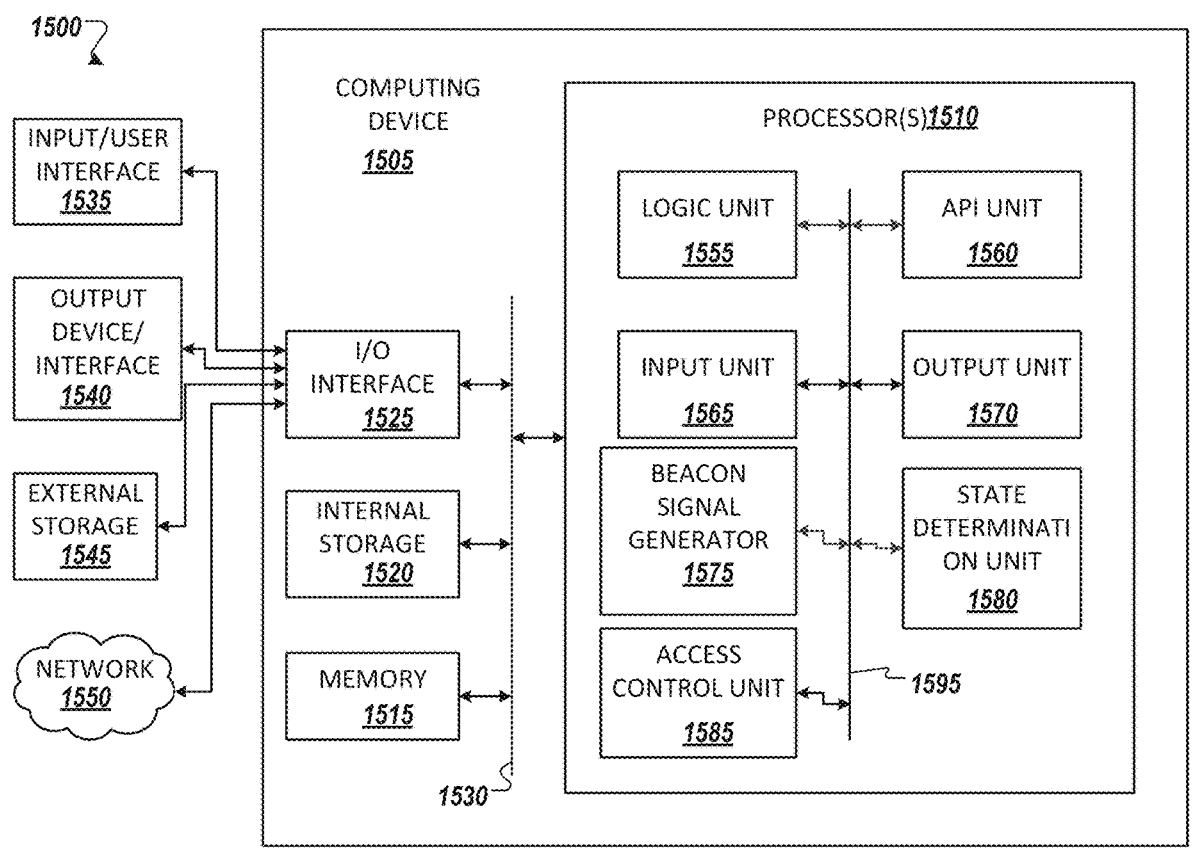
FIG. 15 illustrates an example computing environment with an example computer device suitable for use in some example implementations.

FIG. 15 illustrates an example computing environment 1500 with an example computer device 1505 suitable for use in some example implementations. Computing device 1505 in computing environment 1500 can include one or more processing units, cores, or processors 1510, memory 1515 (e.g., RAM, ROM, and/or the like), internal storage 1520 (e.g., magnetic, optical, solid state storage, and/or organic), and/or I/O interface 1525, any of which can be coupled on a communication mechanism or bus 1530 for communicating information or embedded in the computing device 1505.

Computing device 1505 can be communicatively coupled to input/interface 1535 and output device/interface 1540. Either one or both of input/interface 1535 and output device/interface 1540 can be a wired or wireless interface and can be detachable. Input/interface 1535 may include any device, component, sensor, or interface, physical or virtual, which can be used to provide input (e.g., buttons, touch-screen interface, keyboard, a pointing/cursor control, microphone, camera, braille, motion sensor, optical reader, and/or the like).

Output device/interface 1540 may include a display, television, monitor, printer, speaker, braille, or the like. In some example implementations, input/interface 1535 (e.g., user interface) and output device/interface 1540 can be embedded with, or physically coupled to, the computing device 1505. In other example implementations, other computing devices may function as, or provide the functions of, an input/interface 1535 and output device/interface 1540 for a computing device 1505. These elements may include, but are not limited to, well-known AR hardware inputs so as to permit a user to interact with an AR environment.

Examples of computing device 1505 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like).

Computing device 1505 can be communicatively coupled (e.g., via I/O interface 1525) to external storage 1545 and network 1550 for communicating with any number of networked components, devices, and systems, including one or more computing devices of the same or different configuration. Computing device 1505 or any connected computing device can be functioning as, providing services of, or referred to as, a server, client, thin server, general machine, special-purpose machine, or another label.

I/O interface 1525 can include, but is not limited to, wired and/or wireless interfaces using any communication or I/O protocols or standards (e.g., Ethernet, 802.11xs, Universal System Bus, WiMAX, modem, a cellular network protocol, and the like) for communicating information to and/or from at least all the connected components, devices, and network in computing environment 1500. Network 1550 can be any network or combination of networks (e.g., the Internet, local area network, wide area network, a telephonic network, a cellular network, satellite network, and the like).

Computing device 1505 can use and/or communicate using computer-usable or computer-readable media, including transitory media and non-transitory media. Transitory media includes transmission media (e.g., metal cables, fiber optics), signals, carrier waves, and the like. Non-transitory media includes magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 1505 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 1510 can execute under any operating system (OS) (not shown), in a native or virtual environment. One or more applications can be deployed that include logic unit 1555, application programming interface (API) unit 1560, input unit 1565, output unit 1570, beacon signal generator 1575, state determination unit 1580, access control unit 1585, and inter-unit communication mechanism 1595 for the different units to communicate with each other, with the OS, and with other applications (not shown).

For example, the beacon signal generator 1575, the state determination unit 1580, and the access control unit 1585 may implement one or more processes shown above with respect to the structures described above. The described units and elements can be varied in design, function, configuration, or implementation and are not limited to the descriptions provided.

In some example implementations, when information or an execution instruction is received by API unit 1560, it may be communicated to one or more other units (e.g., logic unit 1555, input unit 1565, beacon signal generator 1575, state determination unit 1580, and access control unit 1585).

For example, the beacon signal generator 1575 may generate beacon outputs at both the interior and exterior of the confined space, either as a part of the structure of the workbooth for example, or in association with the device associated with the user, as explained above. The state determination unit 1580 may determine a state based on sensing or receipt of the beacon outputs, such as at a microphone associated with the device of the user, which may be a wearable or a mobile phone, and based on the identity of the origin beacon from which the detected or sensed signal was generated, and the location of that beacon. Additionally, the access control unit 1585 may determine and access control condition, such as locked or unlocked, and may also generate a signal to perform the locking or unlocking action, based on the state, such as by use of a state table or the like.

In some instances, the logic unit 1555 may be configured to control the information flow among the units and direct the services provided by API unit 1560, input unit 1565, beacon signal generator 1575, state determination unit 1580, and access control unit 1585 in some example implementations described above. For example, the flow of one or more processes or implementations may be controlled by logic unit 1555 alone or in conjunction with API unit 1560.

Figure 16:
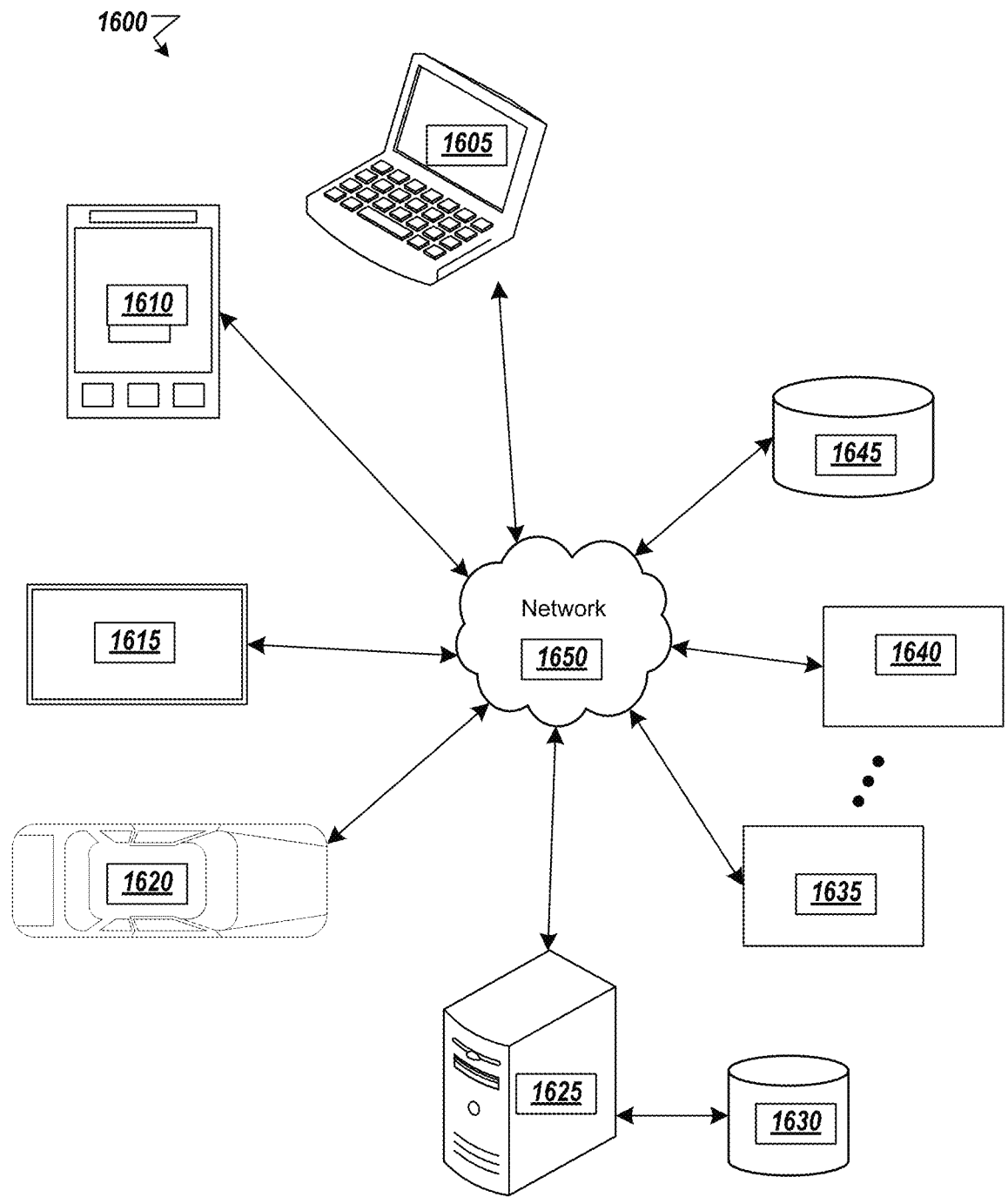
FIG. 16 shows an example environment suitable for some example implementations.

FIG. 16 shows an example environment suitable for some example implementations. Environment 1600 includes devices 1605-1645, and each is communicatively connected to at least one other device via, for example, network 1660 (e.g., by wired and/or wireless connections). Some devices may be communicatively connected to one or more storage devices 1630 and 1645.

An example of one or more devices 1605-1645 may be computing devices 1505 described in FIG. 15, respectively. Devices 1605-1645 may include, but are not limited to, a computer 1605 (e.g., a laptop computing device) having a monitor and an associated webcam as explained above, a mobile device 1610 (e.g., smartphone or tablet), a television 1615, a device associated with a vehicle 1620, a server computer 1625, computing devices 1635-1640, storage devices 1630 and 1645.

The devices may be communicatively connected, including but not limited to AR peripherals that are well known in the art to permit a user to interact in AR, VR, mixed reality, or other environments. Further, the devices may include media object capture hardware, as would be understood by those skilled in the art.

In some implementations, devices 1605-1620 may be considered user devices associated with the users of the enterprise. Devices 1625-1645 may be devices associated with service providers (e.g., used by the external host to provide services as described above and with respect to the various drawings, and/or store data, such as webpages, text, text portions, images, image portions, audios, audio segments, videos, video segments, and/or information thereabout).

The foregoing example implementations may have various benefits and advantages over the related art. For example, but not by way of limitation, while related art "smart" door locks have relied on Bluetooth and near field technology, these related art technologies are not capable of determining whether a device associated with a user, and hence the user, is on one side or the other side of a physical boundary such as a wall. The example implementations described herein overcome this related art disadvantage by the use of inaudible audio signals, which do not cross the physical boundary.

Further, while related art ultrasonic audio approaches have been used to associate devices, track devices, determine distance or send codes, these related art approaches have not been used for controlling access to doors. Further, the related art approaches only provide a one-way gate with respect to access, and do not control physical access to a confined space. Further, the example implementation can send information indicative of an identity, so as to prevent or permit physical access to the confined space. Related art approaches such as motion detectors cannot send data, and only provide a binary detection as to whether a user is present or not, without any further validation. Additional related art approaches are incapable of determining whether a user is inside or outside of a physical confined space. The present example implementations may overcome these and other problems and disadvantages.

In some example implementations, the determination of proximity is binary (e.g., present or not present). However, in other example implementations, the determination may be non-binary (e.g., degree of closeness to workbooth). In other words, IAX beacons may be used with applications that require either discrete or continuous proximity information. For example, but not by way of limitation, an application may utilize an IAX beacon to determine if a user is in a workbooth or not (discrete). A different application could use an IAX beacon to determine relatively how far away a user is from a public display (continuous).

While some of the foregoing example implementations may be directed to workbooths as the confined spaces, other confined spaces may be substituted therefor without departing from the inventive scope. For example, but not by way of limitation, while related art smart locks may use geofencing to automatically unlock a door, errors can occur based on an incorrect assumption about a user's location, leading to an incorrect system state. According to an example implementation, in which the first inaudible audio signal is generated interior to a door of a home or other residence (e.g., internal facing place of a smart lock), the system correctly senses whether the user has entered the residence, and correctly determines the state, so that the locking and unlocking is performed without the related art errors.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A method of controlling access to an enclosed area having a boundary, comprising:
    generating a first audio signal inside the enclosed area, and generating a second signal outside of the enclosed area, each configured to be sensed by respective sensing devices, wherein the first audio signal and the second signal do not penetrate the boundary;
    determining a state of the enclosed area, based on the first audio signal and the second signal being sensed by the respective sensing devices;
    based on the state, generating an instruction to perform access control for the enclosed area; and
    based on the generated instruction, locking a door associated with the enclosed area where the state comprises the second signal sensed by the sensing device and the first audio signal not sensed by the sensing device, or unlocking the door associated with the enclosed area where the state comprises the first audio signal sensed by the sensing device and the second signal not sensed by the sensing device.

2. The method of claim 1, further comprising sensing an electromagnetic frequency (EMF) signal that penetrates the boundary.

3. The method of claim 1, wherein at least one of the first audio signal and the second audio signal is generated by a device associated with the enclosed area, and the sensing device is coupled to a communication device associated with a user, or, the at least one of the first audio signal and the second audio signal is generated by a communication device associated with a user, and the sensing device is coupled to a device associated with the enclosed area.

4. The method of claim 2, wherein the determining further comprises determining the state of the enclosed area based on the first audio signal or the second audio signal, and the EMF signal, being sensed by the sensing device, so as to provide an indication that a user is proximal to the enclosed area.

5. The method of claim 1, wherein the first audio signal and the second audio signal are generated by a first speaker and a second speaker, respectively, and include one or more bits of information associated with an origin of the first audio signal or an origin of the second audio signal.

6. The method of claim 1, wherein the first audio signal and the second audio signal comprise a first Inter-Asterisk eXchange (IAX) beacon signal and a second IAX beacon signal, respectively.

7. The method of claim 1, wherein the generating the instruction comprises generating a command signal to lock the door associated with the enclosed area where the state comprises the second audio signal sensed by the sensing device and the first audio signal not sensed by the sensing device, or to unlock the door associated with the enclosed area where the state comprises the first audio signal sensed by the sensing device and the second audio signal not sensed by the sensing device.

8. The method of claim 1, wherein the sensing device is a microphone coupled to a mobile phone or a wearable device associated with the user.

9. A non-transitory computer readable medium having a storage and processor, the processor capable of executing instructions for controlling access to an enclosed area having a boundary, the instructions comprising:
    generating a first audio signal inside the enclosed area, and generating a second audio signal outside of the enclosed area, each configured to be sensed by respective sensing devices, wherein the first audio signal and the second audio signal do not penetrate the boundary;
    determining a state of the enclosed area, based on the first audio signal and the second signal being sensed by the respective sensing devices;
    based on the state, generating an instruction to perform access control for the enclosed area; and
    based on the generated instruction, locking a door associated with the enclosed area where the state comprises the second signal sensed by the sensing device and the first audio signal not sensed by the sensing device, or unlocking the door associated with the enclosed area where the state comprises the first audio signal sensed by the sensing device and the second audio signal not sensed by the sensing device.

10. The non-transitory computer readable medium of claim 9, further comprising an electromagnetic frequency (EMF) signal that penetrates the boundary.

11. The non-transitory computer readable medium of claim 9, wherein at least one of the first audio signal and the second audio signal is generated by a device associated with the enclosed area, and the sensing device is coupled to a communication device associated with a user, or, the at least one of the first audio signal and the second audio signal is generated by a communication device associated with a user, and the sensing device is coupled to a device associated with the enclosed area.

12. The non-transitory computer readable medium of claim 9, wherein the first audio signal and the second audio signal are generated by a first speaker and a second speaker, respectively, and include one or more bits of information associated with an origin of the first audio signal or an origin of the second audio signal.

13. The non-transitory computer readable medium of claim 9, wherein the first audio signal and the second audio signal comprise a first Inter-Asterisk eXchange (IAX) beacon signal and a second IAX beacon signal, respectively.

14. The non-transitory computer readable medium of claim 9, wherein the generating the instruction comprises generating a command signal to lock the door associated with the enclosed area for the state comprising the second audio signal sensed by the sensing device and the first audio signal not sensed by the sensing device, or to unlock the door associated with the enclosed area for the state comprising the first audio signal sensed by the sensing device and the second audio signal not sensed by the sensing device.

15. The non-transitory computer readable medium of claim 9, wherein the sensing device is a microphone coupled to a mobile phone or a wearable device associated with the user.

16. A system for controlling access to a controlled-access environment having a boundary and an access point, the system comprising:
- an output device that generates a first audio signal internal to the boundary of the controlled-access environment, and a second audio signal outside of the enclosed area, each configured to be sensed by respective sensing devices, wherein the first audio signal and the second audio signal do not penetrate the boundary and the access point in a closed position;
- a processor that determines a state of the controlled-access environment, based on the first audio signal and the second signal being sensed by the respective sensing devices, and, based on the determined state, generates an instruction to perform access control of the access point; and
- based on the generated instruction, the processor locks a door associated with the enclosed area where the state comprises the second signal sensed by the sensing device and the first audio signal not sensed by the sensing device, or the processor unlocks the door associated with the enclosed area where the state comprises the first audio signal sensed by the sensing device and the second audio signal not sensed by the sensing device.

17. The system of claim 16, further comprising an electromagnetic frequency (EMF) signal that penetrates the boundary.

18. The system of claim 17, further comprising a second output device generating the electromagnetic frequency (EMF) signal capable of penetrating the boundary, wherein the processor determines the state of the controlled-access environment based on the first audio signal or the second audio signal, and the EMF signal, being sensed by the sensing device, so as to provide an indication that a user is proximal to the enclosed area.

19. The system of claim 16, wherein the first audio signal and the second audio signal are generated by a first speaker and a second speaker, respectively, and the sensing device is a microphone coupled to a mobile phone or a wearable device associated with the user, and further, the first audio signal and the second audio signal are a first Inter-Asterisk eXchange (IAX) beacon signal and a second IAX beacon signal, respectively.

* * * * *